Figure 5:
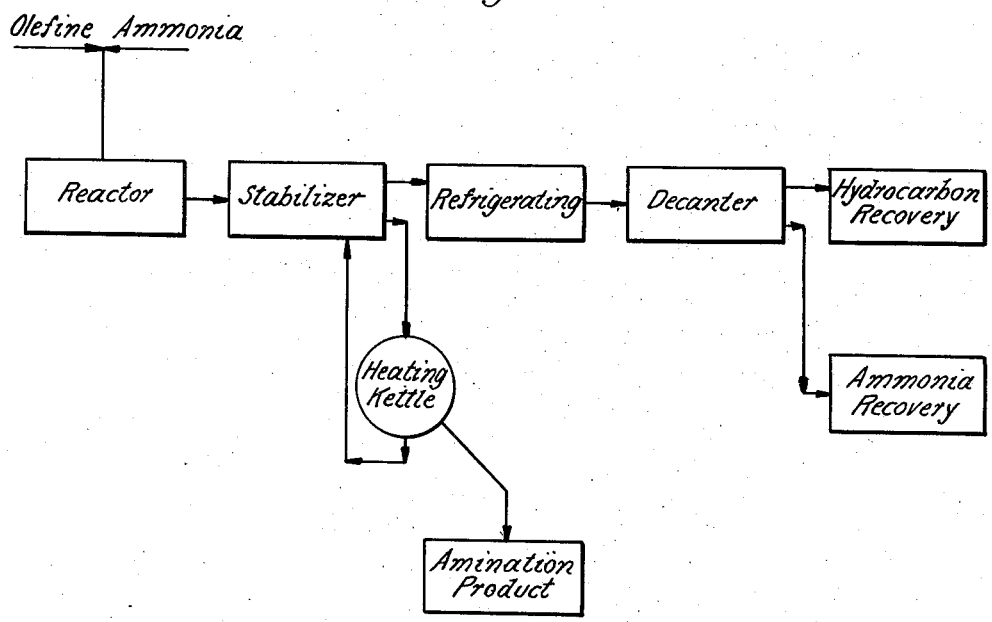

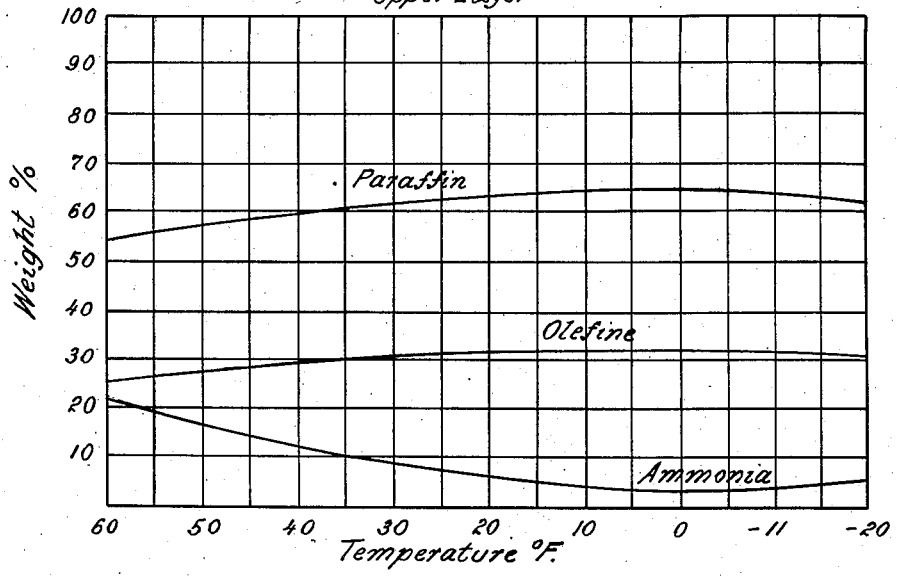
Fig. 1. Ammonia – Propane, Propylene Separation Upper Layer
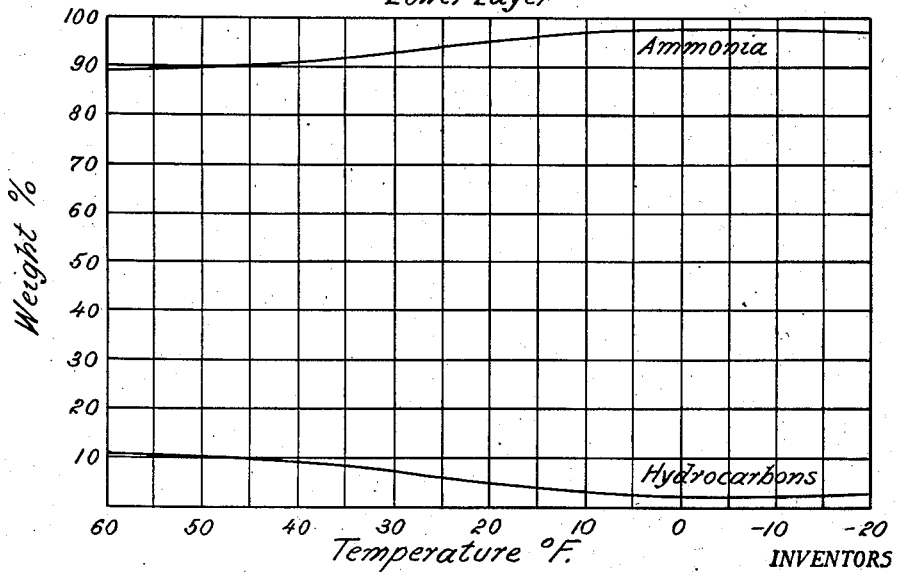
Fig. 2. Ammonia – Hydrocarbon – Separation Lower Layer
INVENTORS
JOHN W. TETER
ROBERT H. STOOKEY

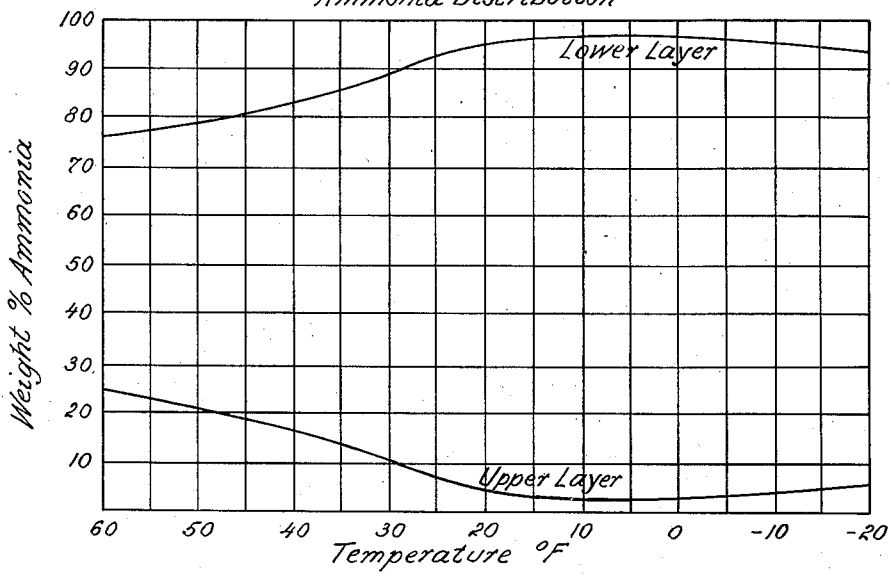
Fig. 3. Ammonia Distribution
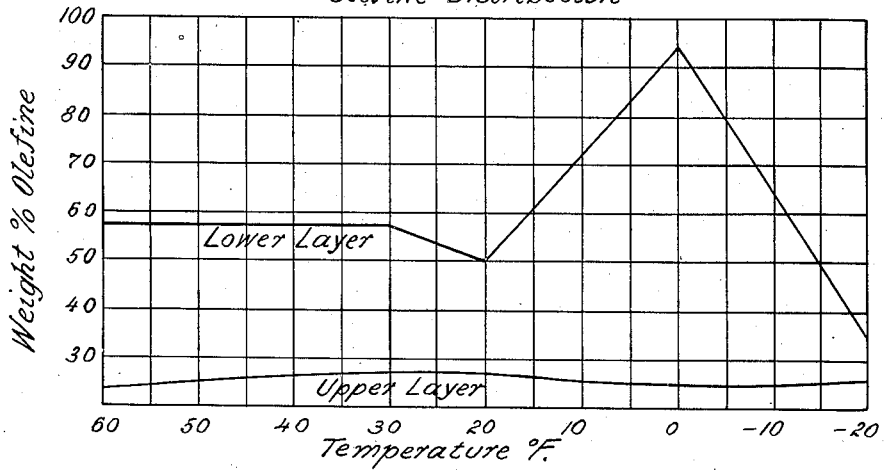
Fig. 4. Olefine Distribution

Patented Feb. 8, 1949

2,461,010

UNITED STATES PATENT OFFICE 2,461,010

PROCESS FOR THE RECOVERY OF AMMONIA

John W. Teter, Chicago, Ill., and Robert H. Stookey, Whiting, Ind., assignors to Sinclair Refining Company, New York, N. Y., a corporation of Maine Application December 29, 1942, Serial No. 470,450

1 Claim. (Cl. 260—585)

This invention relates to the separation and recovery of ammonia and hydrocarbons from mixtures containing these constitutents. The invention is particularly applicable to the separation and recovery of unreacted ammonia and of hydrocarbons contained in the effluent gases from a process in which olefines are aminated by reaction with ammonia.

In amination processes of the type mentioned, an olefine such as propylene, for example, and ammonia, advantageously anhydrous, are brought into intimate contact with a suitable catalyst at an elevated temperature and at superatmospheric pressure with resulting production of organic nitrogen-containing material comprising the aminated olefine. The amination reaction usually effects only a partial conversion of the olefine with the result that the effluent from the process contains important proportions of unreacted olefine and ammonia. Although the unreacted olefine and ammonia are suitable for recycling to the amination process for further conversion to the aminated product, they are contaminated by relatively large proportions of hydrogen, methane, ethane, propane and other higher hydrocarbons, both saturated and unsaturated, formed as a result of cracking, polymerization, hydrogenation and dehydrogenation which occur as side reactions accompanying the amination reaction. Not only do these contaminants dilute the propylene-ammonia mixture, and thus prevent direct recycling of the effluent to the amination reaction zone, but their production results in an important alteration of the relative proportions of propylene and ammonia in the effluent as compared to the relative proportions of propylene and ammonia initially charged to the reaction zone.

The desired reaction product may be recovered advantageously by passing the composite effluent from the reaction zone to a stabilizer maintained under pressure and wherein the organic nitrogen-containing product, i. e., the aminated olefine, is separated by controlled volatilization of unconsumed reactants and products of the side reactions. The aminated olefine is withdrawn from the lower part of the stabilizer, and the more volatile unreacted olefine and ammonia and products of the side reactions pass off as overhead. The volatile overhead products are advantageously at least partially condensed to provide a reflux material for the stabilizer, and the portion of the overhead not returned for refluxing contains, as noted hereinabove, not only the products of the side reactions from the amination reaction zone but also the unreacted olefine and ammonia.

A process has been proposed for the separation and recovery of ammonia from this stabilizer overhead involving total absorption and recovery of the ammonia by a combined aqueous absorption and distillation system. The relatively large amount of unreacted ammonia in the stabilizer overhead, i. e., the amination reaction effluent from which the amination product has been removed, requires an absorption-distillation system of large capacity. Moreover, the use of an aqueous absorption medium requires careful control of the distillation step in order to obtain substantially anhydrous ammonia which is usually desired for recycling to the reaction zone of the amination process.

We have found that if a mixture of ammonia and hydrocarbons consisting essentially of propane and propylene, for example, the stabilizer overhead from an amination process of the type described, is cooled to a temperature of about 74° F., and advantageously to a temperature within the range of about 20° F. to about −20° F., under sufficient pressure to establish substantially liquid phase conditions, the ammonia and the propane-propylene components separate into two layers. The more volatile substances, such as hydrogen, methane, ethane, etc., which are not condensed or absorbed in the liquid hydrocarbon layer, remain in the vapor phase and may thus readily be separated from the liquid components. The upper layer comprises the hydrocarbons containing a small proportion of the ammonia, and the lower layer comprises the ammonia containing a small proportion of the hydrocarbons. In accordance with our invention, we cool the mixture of ammonia and hydrocarbons to a temperature of 74° F. or below under sufficient pressure to establish substantially liquid phase conditions at that temperature, and effect settling of the cooled liquid mixture with resulting formation of two distinct layers comprising the ammonia and the hydrocarbons, respectively. We then separate the ammonia and hydrocarbon layers. Settling of the liquid mixture is advantageously carried out in a suitable chamber from the upper vapor space of which the uncondensed hydrogen, methane, etc., may be withdrawn, and the ammonia and hydrocarbon liquid layers may readily be separated by decantation or the like. The greater part of the ammonia from the stabilizer overhead, and containing only a relatively small amount of the propane and propylene, is thus separately recovered for recycling to the reaction zone of the amination process. The remainder of the ammonia from the stabilizer overhead, contained in the propane-propylene liquid layer, is readily recovered by aqueous absorption followed by distillation in an appropriate absorption-distillation system of modest size.

We have found, furthermore, that the amination product is soluble in both the ammonia layer and the hydrocarbon layer. For this reason the amination product is removed in accordance with our invention from the amination reactor effluent before separation of the ammonia and hydrocarbon components rather than to remove the amination product from these components individually after their separation from one another.

In cooling the mixture of ammonia and hydrocarbons obtained as the overhead from the stabilizing operation of an amination process, advantage is taken of the cooling of this mixture effected in condensing the mixture for the return of a portion of the mixture as refluxing medium for the stabilizer. Partial cooling to the desired extent required in accordance with our invention is thus already provided by the usual operation of the amination process.

Cooling is carried out, in accordance with the invention, to such an extent as to lower the temperature of the ammonia-hydrocarbon mixture to about 74° F. or below. We have found that under sufficient pressure to establish liquid phase conditions visible separation of the ammonia and the hydrocarbon component begins as the mixture is cooled to a temperature of about 74° F. The liquid ammonia settles to the bottom and the liquid hydrocarbons float thereon in an upper layer. Although effective and useful separation occurs at this temperature, the ammonia is nevertheless present in the hydrocarbon liquid layer in considerable concentration and the hydrocarbons are also present in substantial amounts in the ammonia layer. We have found, however, that at temperatures substantially within the range of about 20° F. to −20° F. the separation so effected is of such nature that the ammonia layer may be returned directly, and without further treatment, to the amination reaction zone. Thus, for example, when a mixture comprising about 40% ammonia and 60% of a hydrocarbon component composed of about 34% propylene and about 56% propane is cooled to a temperature within the range of about 20° F. to −20° F., the ammonia layer contains only about 2% by weight of the hydrocarbons. Moreover, the hydrocarbon layer contains only about 2% by weight of ammonia within this temperature range.

The effect of the temperature to which the ammonia-hydrocarbon mixture is cooled upon the sharpness of separation is illustrated in the table wherein there is presented experimental data obtained by treatment of a mixture of ammonia and hydrocarbons in which the hydrocarbon component comprised 0.4% ethylene, 4.8% ethane, 33.3% propylene, 56.4% propane and 5.1% of C4 hydrocarbons, the percentages being by weight. In each of the tests this hydrocarbon component and anhydrous ammonia were charged in admixture to a calibrated "Penberthy" gauge of about 150 cc. capacity in the ratio of about 60 liquid percent hydrocarbons to 40 liquid percent ammonia. This ratio corresponds to a particularly advantageous feed ratio for an amination process for the amination of propylene. In each test the ammonia-hydrocarbon mixture was charged to the gauge in such amount as to leave a vapor space of about 25 cc. at room temperature, the pressure in each instance being sufficient to establish substantially liquid phase conditions at the temperature to which the mixture was cooled and being recorded by a pressure gauge. The "Penberthy" gauge containing the ammonia-hydrocarbon mixture was placed in a bath maintained at the specified temperatures and was allowed to stand in the bath for 1½ to 2 hours in order to insure that the temperature within the gauge was the same as the temperature of the bath. The gauge was then removed from the bath and the layers were discharged into pressure-receivers. The liquid layers separately collected in the pressure receivers were released through acid of known strength, and the acid-insoluble gas was collected, measured and analyzed. Titration of the acid indicated the amount of ammonia present in each layer passed through the acid.

Table

| Temperature, °F | 80 | 74 | 70 | 60 | 30 | 30 | 20 | 0 | −20 |
|---|---|---|---|---|---|---|---|---|---|
| Pressure, #/sq. in | 280 | 260 | 255 | 210 | 140 | 135 | 95 | 75 | 40 |
| Vol. per cent: | | | | | | | | | |
| Upper layer | | 70.3 | 69.2 | 63.6 | 60.2 | 60.6 | 57.9 | 60.0 | 57.8 |
| Lower layer | | 29.7 | 30.8 | 36.4 | 39.8 | 39.4 | 42.1 | 40.0 | 42.1 |
| Weight per cent: | | | | | | | | | |
| Upper layer | | 66.0 | 64.9 | 59.0 | 55.6 | 56.2 | 53.4 | 55.1 | 53.3 |
| Lower layer | | 34.0 | 35.1 | 41.0 | 44.4 | 43.8 | 46.6 | 44.9 | 46.7 |
| Upper layer: | | | | | | | | | |
| Wt. per cent NH3 | | | | 21.4 | 8.3 | 10.6 | 2.0 | 3.2 | 5.5 |
| Wt. per cent Olefine | | | | 24.8 | 30.6 | 30.7 | 30.6 | 31.7 | 31.4 |
| Wt. per cent Paraffin | | | | 53.8 | 61.1 | 58.7 | 67.4 | 65.1 | 63.1 |
| Lower layer: | | | | | | | | | |
| Wt. per cent NH3 | | | | 89.5 | 95.7 | 90.2 | 98.0 | 97.2 | 97.4 |
| Wt. per cent Olefine | | | | 5.1 | 2.1 | 4.8 | 0.9 | 1.9 | 1.0 |
| Wt. per cent Paraffin | | | | 5.4 | 2.2 | 5.0 | 1.1 | 0.9 | 1.6 |

The table shows that at 80° F. there is no separation but that at 74° F. there is a separation of the liquid ammonia-hydrocarbon mixture into layers. Relatively sharp separation takes place at about 60° F. Optimum separation, as indicated by the relative concentration of one component in the layer of the other component, is obtained at temperatures substantially within the range of about 20° F. and −20° F. Within this latter range the ammonia layer contains only about 2–3% of the hydrocarbon component and the hydrocarbon layer contains a minimum of the ammonia. At higher temperatures, however, each layer contains more of the other component and the solubility of ammonia in the hydrocarbon layer is appreciably greater than the solubility of the hydrocarbons in the ammonia layer. At 60° F., for example, the hydrocarbon layer contains 21.4 weight percent ammonia, whereas the ammonia layer contains only 10.5 weight percent of the hydrocarbons.

The chart comprising Fig. 1 shows the ammonia, olefine and paraffin separation in the top layer within the temperature range of 60° F. to −20° F., and the chart reproduced as Fig. 2 shows the ammonia and hydrocarbon separation in the bottom layer within this temperature range. Fig. 3 illustrates the ammonia distribution between the two layers within the same temperature range. These charts show that with the ammonia-hydrocarbon mixture described above, separation of the ammonia from the propane-propylene hydrocarbon component occurs to a substantial extent even at temperatures of about 60° F. and that particularly advantageous separation takes place within the temperature range of about 20° F. to −20° F.

It should be noted, however, that the advantage in cooling the ammonia-hydrocarbon mixture to a temperature within the range of about 20° F. to —20° F. is not merely one of degree. The olefine (essentially propylene) appears to be selectively dissolved in the ammonia layer within the range of temperatures tested. For example, analysis of the propane-propylene mixture described hereinbefore in an Orsat apparatus showed that the mixture contained about 34.0 weight per cent propylene. At 20° F., 0° F. and —20° F., the weight per cent of propylene in the hydrocarbons of the hydrocarbon layer, as determined by the Orsat apparatus, is substantially the same as in the original propane-propylene component of the ammonia-hydrocarbon mixture charged. However, at 20° F., the olefine comprises 45.0 weight per cent of the hydrocarbons contained in the ammonia layer, at 0° F. it comprises 67.8 weight per cent of the hydrocarbons, and at —20° F. it comprises 37.0 weight per cent of the hydrocarbons in the ammonia. These relative concentrations of the olefine in the hydrocarbons in the upper and lower layers are graphically illustrated in Fig. 4. It is clearly shown therein that within the temperature range of about 20° F. to —20° F. the olefine is selectively concentrated in the hydrocarbon component of the ammonia layer, this concentration reaching a maximum at about 0° F. This concentration of olefine in the hydrocarbon component of the ammonia layer is particularly important when the ammonia layer contains a substantial amount of hydrocarbons, as is the case, for example, where the hydrocarbon component of an ammonia-hydrocarbon mixture contains relatively large amounts of propylene.

As indicated above, the olefine content of the hydrocarbon component of the ammonia-hydrocarbon mixture has a pronounced effect on the separation of the two layers. For example, in the case of a hydrocarbon component comprising 76.0 weight per cent propylene and about 22 weight per cent propane, an admixture of 84 cc. of this hydrocarbon with 56 cc. of anhydrous ammonia, cooled to a temperature of 15° F. under a pressure of 96 pounds per square inch and settled and analyzed as in the preceding examples, the relatively high content of olefine in the hydrocarbon component caused 19.5 weight per cent of the ammonia to appear in the upper (hydrocarbon) layer and 11.0 weight per cent of the hydrocarbons to appear in the lower (ammonia) layer at this temperature. Moreover, although the olefine (propylene) content of hydrocarbons in the upper (hydrocarbon) layer was 75.0 weight per cent and thus substantially the same as in the original hydrocarbon component charged, the olefine content of the hydrocarbons in the ammonia layer had increased to 82.5 weight per cent. Thus, an increasing propylene content in the hydrocarbon component of the ammonia-hydrocarbon mixture increases the mutual solubility of the hydrocarbon and ammonia components in one another at a specific cooling temperature. Temperatures below about 0° F., and advantageously of about —20° F., sharpen the degree of separation between ammonia and such hydrocarbon components of high olefine content at some sacrifice in the concentration of the propylene in the ammonia layer.

Accordingly, cooling of an ammonia-propylene containing hydrocarbon mixture to a temperature within the range of about 20° F. to —20° F. effects not only separation of the ammonia and hydrocarbon components but effects concentration of the propylene in the hydrocarbons absorbed in the ammonia layer, maximum concentration taking place at about 0° F. As a result of this concentration, the ammonia layer is preeminently suitable for direct return to the reaction zone of a propylene amination process. Within this temperature range, maximum separation of the ammonia and hydrocarbon components of the mixture thereof is effected by cooling to a temperature of about —20° F. Accordingly, the return with the ammonia of propane, which is undesirable in the amination reaction zone, is suitably controlled within our preferred temperature range. By cooling to a temperature of about 0° F. the amount of propane in the hydrocarbons contained in the ammonia is kept low by the selective concentration of propylene in these hydrocarbons. By cooling to a temperature of about —20° F., the total amount of hydrocarbons, and hence of propane, contained in the liquid ammonia is reduced to a minimum.

Further tests carried out with such a 76% propylene hydrocarbon component, to which a substantial amount of a butane-butylene fraction had been added, showed that the $C_4$ hydrocarbons are selectively concentrated in the upper (hydrocarbon) layer. Thus, in such a composite hydrocarbon mixture containing 26.9 weight per cent $C_4$ hydrocarbons and mixed with anhydrous ammonia in the ratio of about 65 parts of the hydrocarbons to 75 parts of ammonia, the amount of $C_4$ hydrocarbons in the hydrocarbons contained in the ammonia layer upon separation at a temperature of 15° F. ranged from 0.4 to 3.0 weight per cent in several tests. Unlike propylene, the $C_4$ hydrocarbons are not selectively absorbed in the liquid ammonia component. In fact just the opposite is true, the $C_4$ hydrocarbons being selectively absorbed in the hydrocarbon liquid component. The concentration of $C_4$ hydrocarbons, and principally of butane, in the hydrocarbon layer is of importance in that the butane is not carried in appreciable amounts in the ammonia layer and an undesirable concentration of butane (or of $C_4$ hydrocarbons) is not built up in the amination reaction zone. Thus, the separation of ammonia in accordance with our invention makes possible the direct return of the ammonia to the propylene amination reaction zone without any detrimental effect on the desired maintenance of a low concentration of $C_4$ hydrocarbons in the reaction zone.

The pressure required for carrying out the method of our invention is essentially that required to establish substantially liquid phase conditions and may readily be ascertained for each particular ammonia-hydrocarbon mixture at any desired cooling temperature. The long settling period described in connection with the foregoing tests is not necessary in the practice of our invention inasmuch as visible separation of the cooled liquid mixture into separate layers takes place immediately upon cooling of the mixture of ammonia and propane-propylene to temperatures of about 74° F. and lower. Thus, separation of the two layers may be effected readily and efficiently by separately and continuously withdrawing the layers from a decanter or settling vessel to which the cooled mixture is continuously charged under appropriate pressure to maintain substantially liquid phase conditions.

A specific embodiment of our invention in an amination process is illustrated in Fig. 5. An olefine hydrocarbon, consisting predominantly of propylene, and substantially anhydrous ammonia are charged to a reactor in which they are brought into contact with an amination catalyst at an elevated temperature and pressure. The effluent from the reactor is delivered to the stabilizer provided with a heating kettle and adapted to effect volatilization of the unreacted ammonia and propylene and of products of side reactions, such as hydrogen, methane, ethane, ethylene, propane, etc., in the form of overhead with accumulation of the amination product in the bottom of the stabilizer from which it is removed. The overhead is cooled and condensed by refrigeration, say by a liquid ammonia cooling coil, and the condensed overhead is allowed to settle in the decanter with the formation of two liquid layers. A portion of the condensed overhead may be returned advantageously to the stabilizer as a reflux medium. The upper layer, comprising the liquid hydrocarbons, is withdrawn from the decanter for recovery and treatment to provide propylene for recycling to the reactor. The relatively small amount of ammonia contained in the upper layer may be separated from the hydrocarbons by any appropriate procedure, advantageously by aqueous absorption and distillation. The lower layer, comprising the ammonia and containing only a small amount of hydrocarbons, is recovered by being drawn off from the bottom of the decanter and is in suitable condition to be returned to the reactor as an important source of the supply of ammonia required.

We claim:

In the amination of propylene wherein a mixture of propylene and ammonia is brought at an elevated temperature and pressure into contact with a catalyst capable of selectively aminating the propylene, the improvement which comprises stabilizing the resulting mixture to recover the aminated propylene and to produce a gaseous mixture of the unreacted components consisting predominantly of ammonia, propane and propylene, cooling the gaseous mixture to a temperature of about 0° F. under sufficient pressure to establish substantially liquid phase conditions at such temperature, effecting settling of the cooled liquid mixture with resulting formation of two distinct layers one of which comprises predominantly the ammonia and the other comprises predominantly the propane and propylene, separating the layer comprising predominantly the ammonia and the layer comprising predominantly the propane and propylene and returning the ammonia to the amination operation.

JOHN W. TETER.
ROBERT H. STOOKEY.

REFERENCES CITED

The following references are of record in the file of this patent:

UNITED STATES PATENTS

| Number | Name | Date |
|---|---|---|
| 1,518,421 | Wakeford | Dec. 9, 1924 |
| 1,690,585 | Kniskern | Nov. 6, 1928 |
| 1,745,730 | Uhde | Feb. 4, 1930 |
| 1,973,474 | Egloff | Sept. 11, 1934 |
| 2,156,234 | Bays | Apr. 25, 1939 |
| 2,245,028 | Farris | June 10, 1941 |
| 2,306,553 | Miller | Dec. 29, 1942 |
| 2,370,063 | Nutting | Feb. 26, 1945 |

FOREIGN PATENTS

| Number | Country | Date |
|---|---|---|
| 479,079 | Germany | Sept. 20, 1930 |
| 319,205 | Great Britain | Oct. 9, 1930 |
| 422,139 | Great Britain | Jan. 7, 1935 |